US010537880B2

(12) United States Patent
Cho et al.

(10) Patent No.: US 10,537,880 B2
(45) Date of Patent: Jan. 21, 2020

(54) CARRIER-NANOPARTICLE COMPLEX, METHOD FOR PREPARING SAME, AND CATALYST COMPRISING SAME

(71) Applicant: LG CHEM, LTD., Seoul (KR)

(72) Inventors: Jun Yeon Cho, Daejeon (KR); Sang Hoon Kim, Daejeon (KR); Gyo Hyun Hwang, Daejeon (KR); Kwanghyun Kim, Daejeon (KR); Ran Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 83 days.

(21) Appl. No.: 15/520,321

(22) PCT Filed: Nov. 4, 2015

(86) PCT No.: PCT/KR2015/011814
§ 371 (c)(1),
(2) Date: Apr. 19, 2017

(87) PCT Pub. No.: WO2016/072755
PCT Pub. Date: May 12, 2016

(65) Prior Publication Data
US 2017/0312739 A1 Nov. 2, 2017

(30) Foreign Application Priority Data
Nov. 4, 2014 (KR) .................. 10-2014-0152440

(51) Int. Cl.
*B01J 23/89* (2006.01)
*B01J 37/02* (2006.01)
(Continued)

(52) U.S. Cl.
CPC .......... *B01J 23/8913* (2013.01); *B01J 13/02* (2013.01); *B01J 23/38* (2013.01); *B01J 23/42* (2013.01);
(Continued)

(58) Field of Classification Search
CPC ... B01J 23/38; B01J 23/42; B01J 23/44; B01J 23/8913; B01J 27/20; B01J 37/02; B01J 37/024; B01J 37/16
See application file for complete search history.

(56) References Cited

U.S. PATENT DOCUMENTS

2005/0215427 A1 9/2005 Suh et al.
2010/0086832 A1* 4/2010 Lopez .................. B22F 1/0018
429/409

(Continued)

FOREIGN PATENT DOCUMENTS

CA    2 661 489 A1    3/2008
CN   101664685 A      3/2010
(Continued)

OTHER PUBLICATIONS

Machine translation of CN103041823B, publication date Apr. 17, 2013.*

(Continued)

*Primary Examiner* — Jun Li
(74) *Attorney, Agent, or Firm* — Birch, Stewart, Kolasch & Birch, LLP

(57) ABSTRACT

The present specification relates to a carrier-nanoparticle complex, a method for preparing the same, and a catalyst comprising the same.

8 Claims, 9 Drawing Sheets
(6 of 9 Drawing Sheet(s) Filed in Color)

(51) Int. Cl.
| | |
|---|---|
| *B01J 37/16* | (2006.01) |
| *B01J 35/00* | (2006.01) |
| *H01M 4/86* | (2006.01) |
| *B01J 37/12* | (2006.01) |
| *B01J 23/42* | (2006.01) |
| *B01J 13/02* | (2006.01) |
| *B01J 23/38* | (2006.01) |
| *H01M 8/00* | (2016.01) |
| *B01J 27/20* | (2006.01) |
| *B01J 23/44* | (2006.01) |
| *B01J 27/24* | (2006.01) |

(52) U.S. Cl.
CPC .............. *B01J 23/44* (2013.01); *B01J 27/20* (2013.01); *B01J 27/24* (2013.01); *B01J 35/00* (2013.01); *B01J 35/002* (2013.01); *B01J 35/006* (2013.01); *B01J 35/008* (2013.01); *B01J 35/0013* (2013.01); *B01J 35/0073* (2013.01); *B01J 35/0086* (2013.01); *B01J 37/02* (2013.01); *B01J 37/024* (2013.01); *B01J 37/0228* (2013.01); *B01J 37/12* (2013.01); *B01J 37/16* (2013.01); *H01M 4/86* (2013.01); *H01M 8/00* (2013.01); *Y02P 70/56* (2015.11)

(56) References Cited

U.S. PATENT DOCUMENTS

| | | | | |
|---|---|---|---|---|
| 2012/0010069 | A1* | 1/2012 | Takehiro | B01J 13/02 502/5 |
| 2012/0135862 | A1* | 5/2012 | Hwang | B82Y 30/00 502/339 |
| 2012/0208108 | A1* | 8/2012 | Zhang | C23C 18/1635 429/535 |
| 2013/0059231 | A1* | 3/2013 | Hwang | H01M 4/921 429/524 |
| 2014/0171297 | A1* | 6/2014 | Goia | B01J 23/892 502/185 |
| 2015/0333336 | A1* | 11/2015 | Cho | B01J 37/16 429/524 |
| 2016/0318004 | A1* | 11/2016 | Li | C07C 5/03 |

FOREIGN PATENT DOCUMENTS

| | | | |
|---|---|---|---|
| CN | 102500365 A | 6/2012 | |
| CN | 102664275 A | 9/2012 | |
| CN | 103041823 A | 4/2013 | |
| JP | 2005-270976 A | 10/2005 | |
| JP | 2010-501344 A | 1/2010 | |
| KR | 10-2013-0093264 A | 8/2013 | |
| KR | 10-2013-0126472 A | 11/2013 | |
| WO | WO-2013168912 A1 * | 11/2013 | .............. B01J 37/16 |

OTHER PUBLICATIONS

International Search Report issued in PCT/KR2015/011814 (PCT/ISA/210), dated Mar. 16, 2016.
Wang et al. "Multimetallic Au/FePt3 Nanoparticles as Highly Durable Electrocatalyst", Nano Lett., vol. 11, 2011, pp. 919-926.
Wang et al. "Pt-Decorated PdCo @ Pd/C Core-Shell Nanoparticles with Enhanced Stability and Electrocatalytic Activity for the Oxygen Reduction Reaction", J. Am. Chem. Soc., vol. 132, No. 50, 2010, pp. 17664-17666 (Total No. pp. 11).
Wang et al., "Carbon supported Pt-shell modified PdCo-core with electrocatalyst for methanol oxidation", International Journal of Hydrogen Energy, vol. 35, 2010, pp. 10081-10086.
Wang et al., "Facile Synthesis of Carbon-Supported Pd—Co Core-Shell Nanoparticles as Oxygen Reduction Electrocatalysts and Their Enhanced Activity and Stability with Monolayer Pt Decoration", Chem. Mater., vol. 24, 2012, pp. 2274-2281 (Total No. pp. 12).
Zhang et al. "Carbon nanotubes decorated with Pt nanoparticles via electrostatic self-assembly: a highly active oxygen reduction electrocatalyst", Journal of Materials Chemistry, vol. 20, 2010, pp. 2826-2830.
European Search Report for Appl. No. 15856491.4 dated Jun. 4, 2018.

* cited by examiner

[Figure 1]
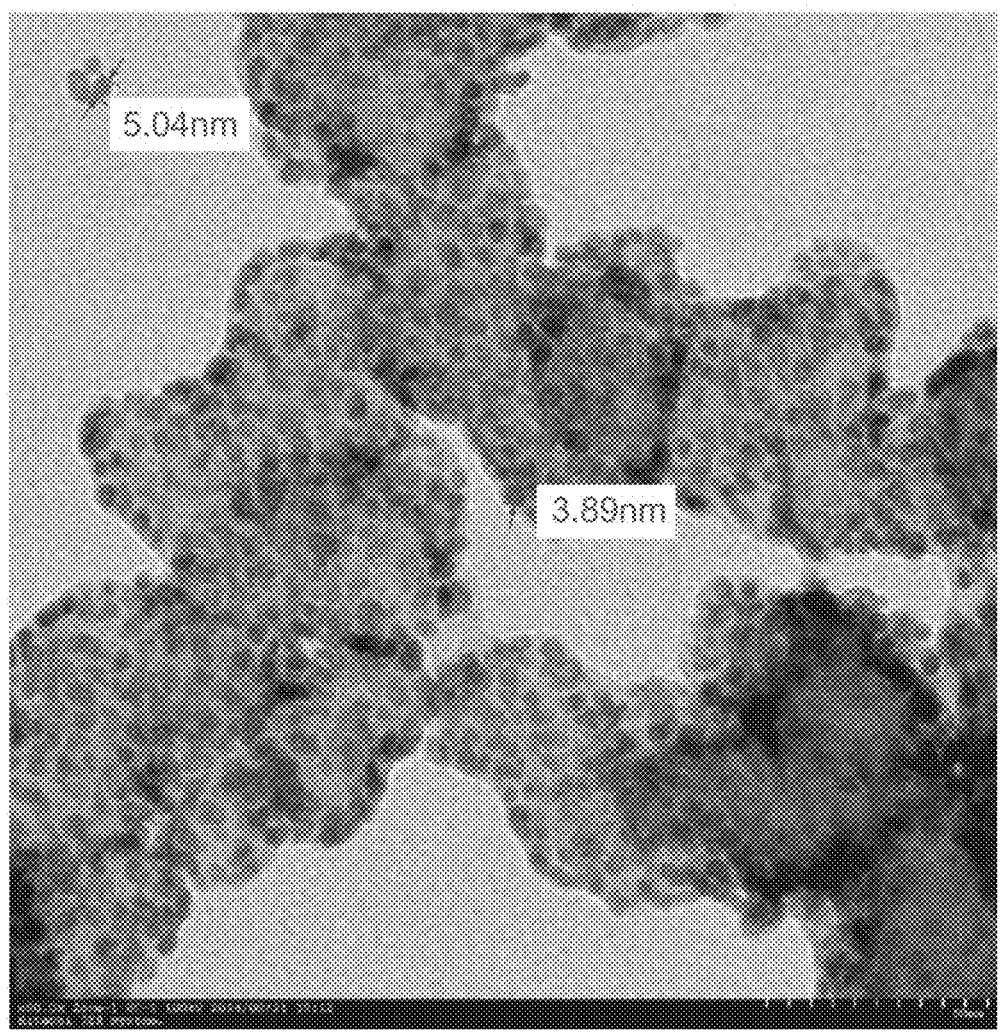

[Figure 2]
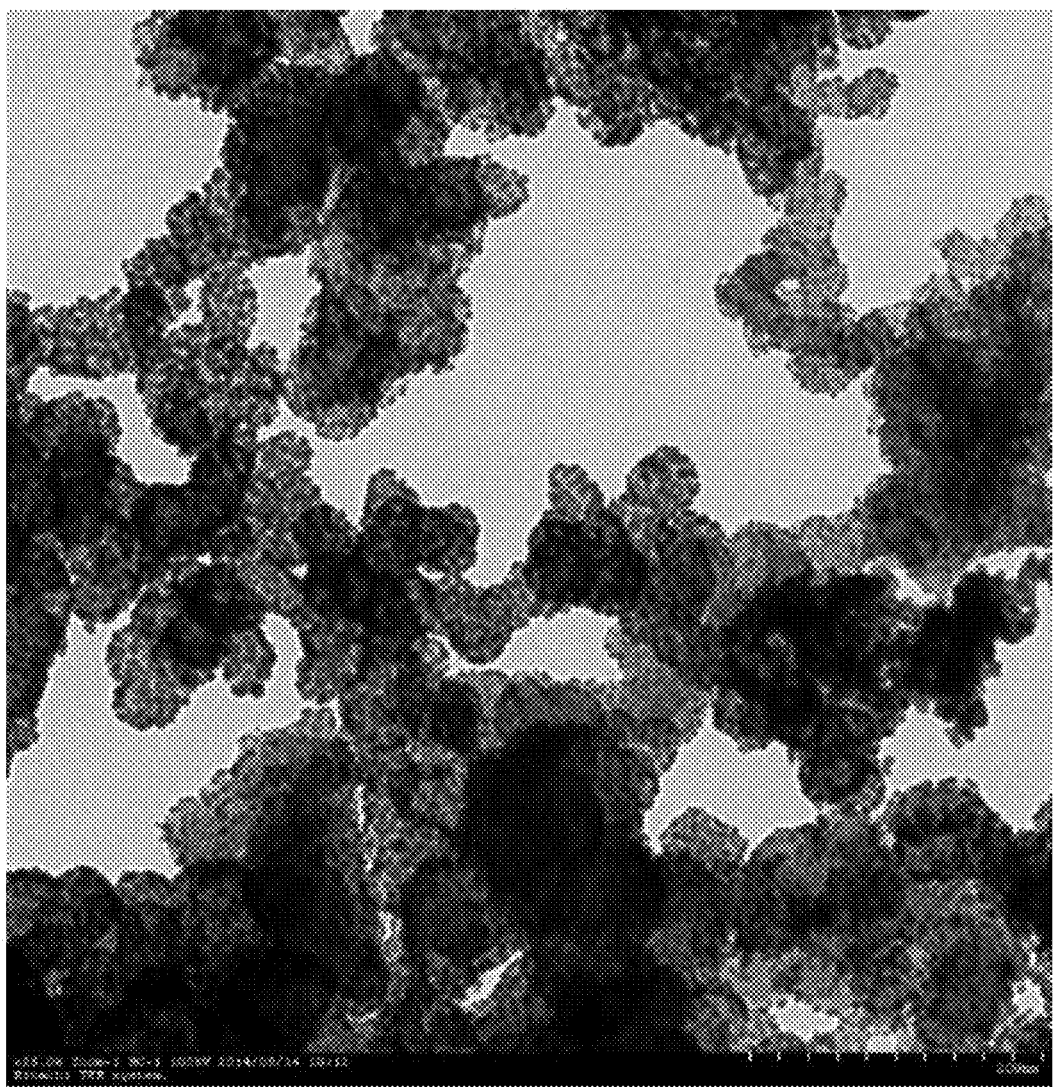

[Figure 3]
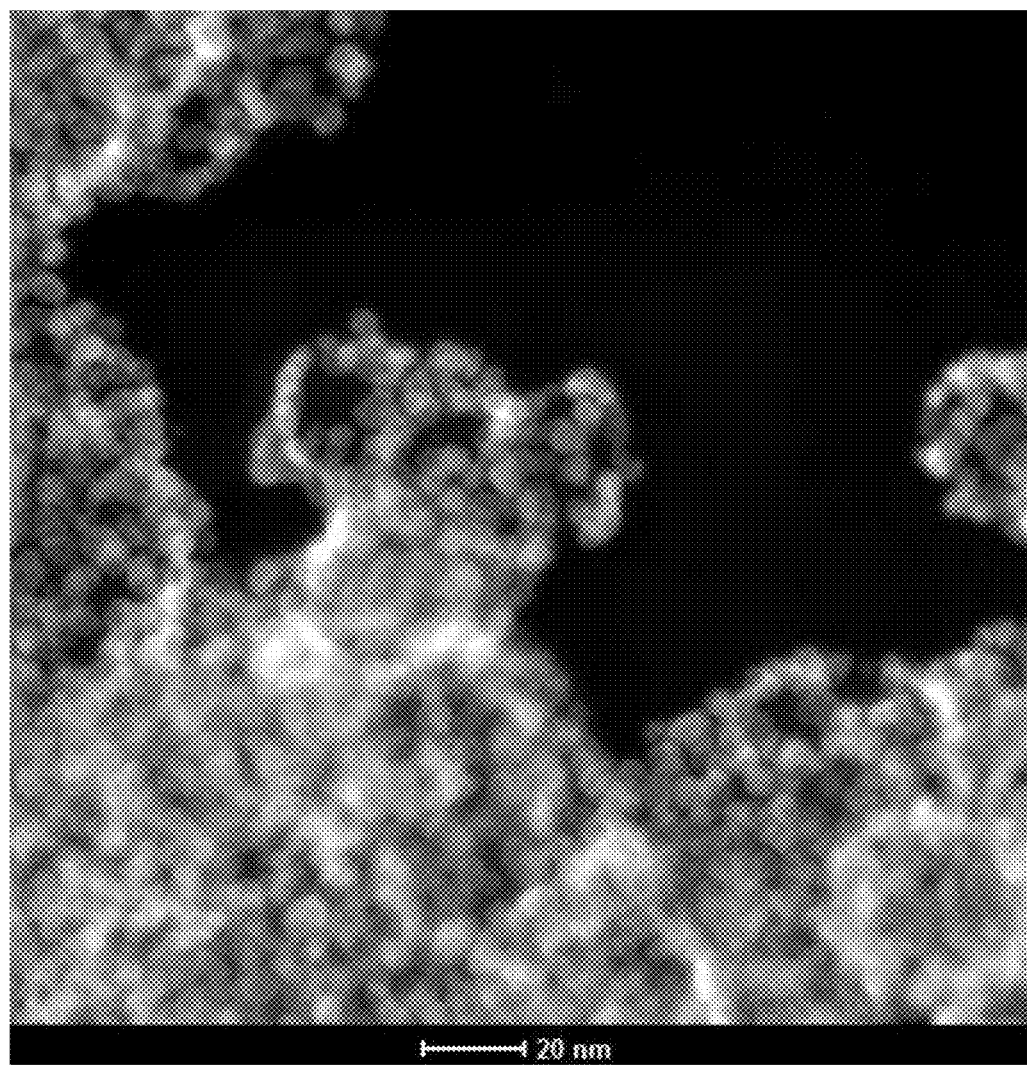

[Figure 4]
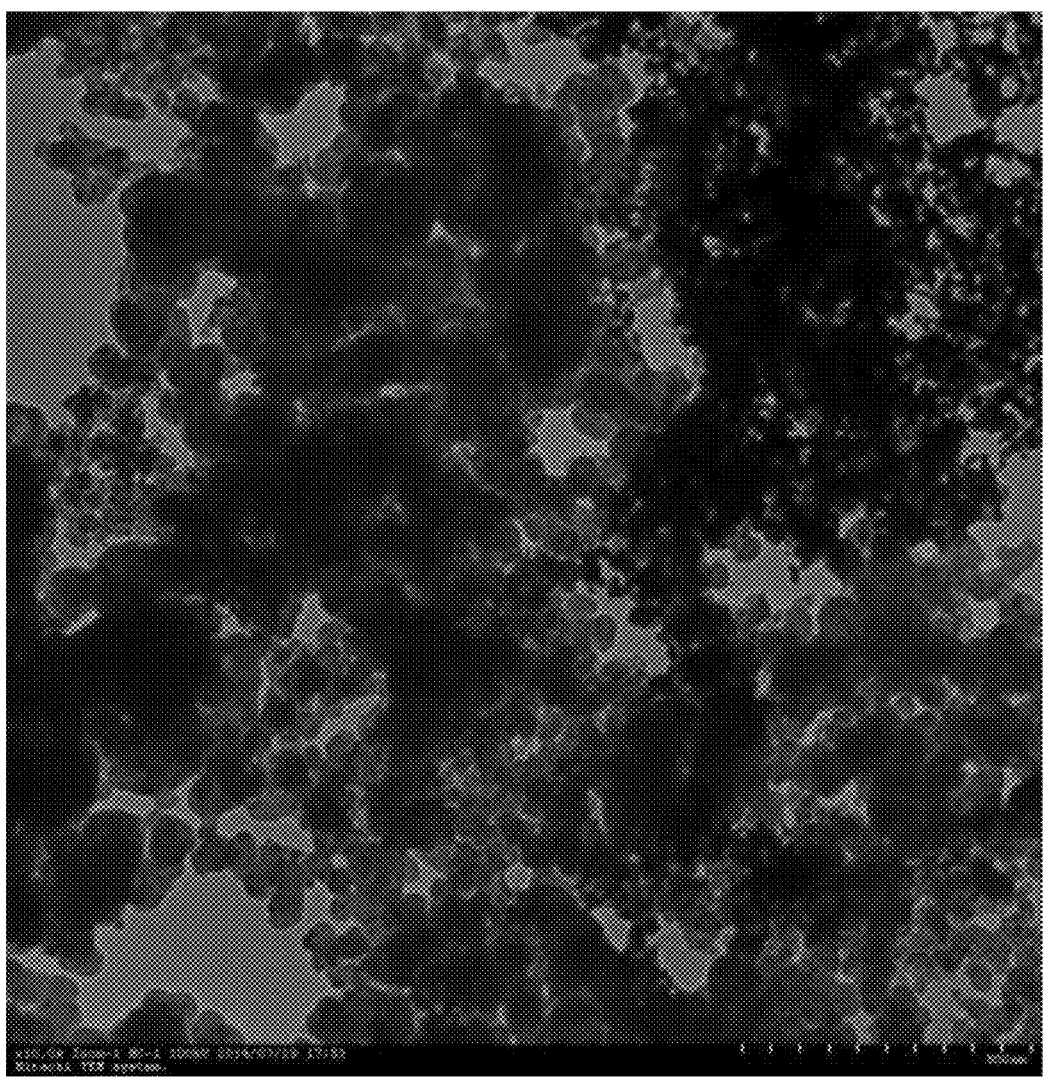

[Figure 5]
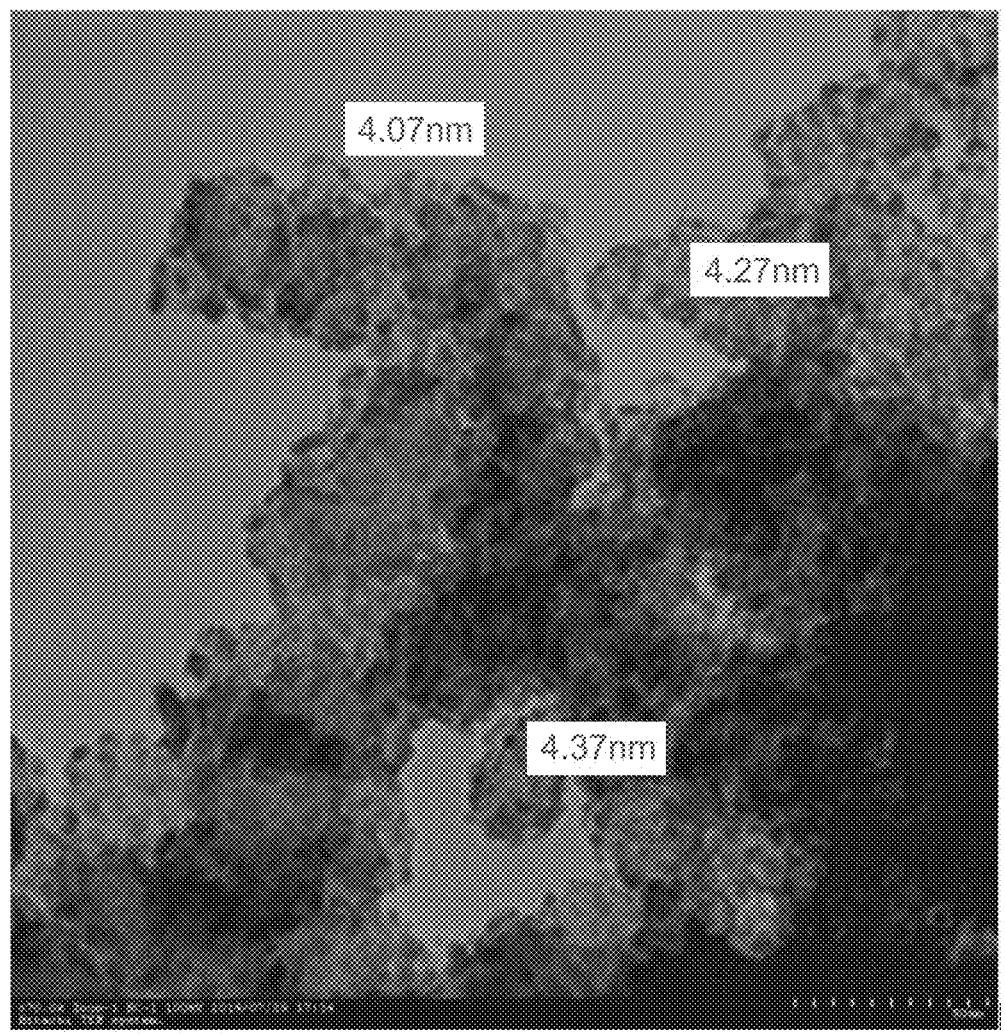

[Figure 6]
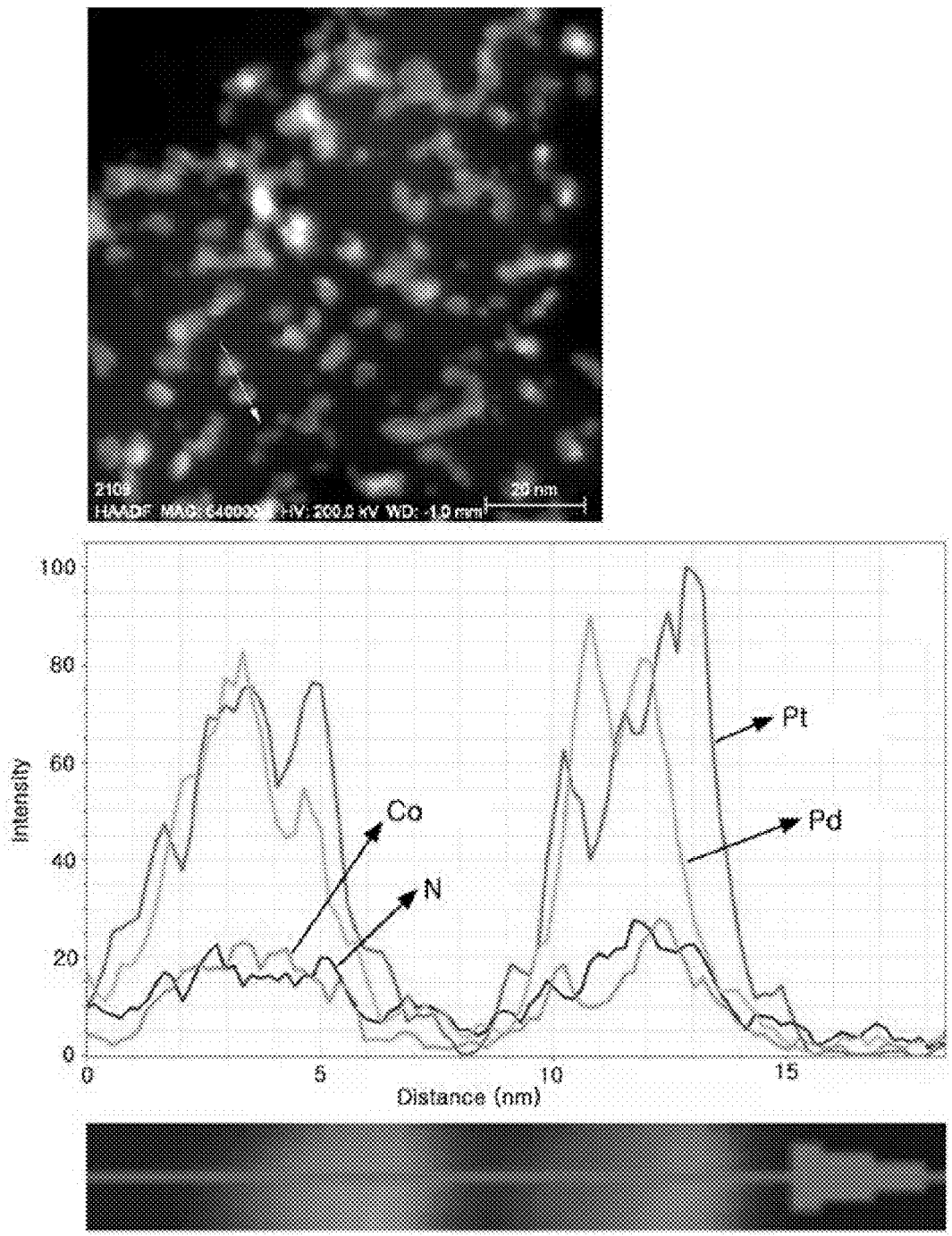

[Figure 7]
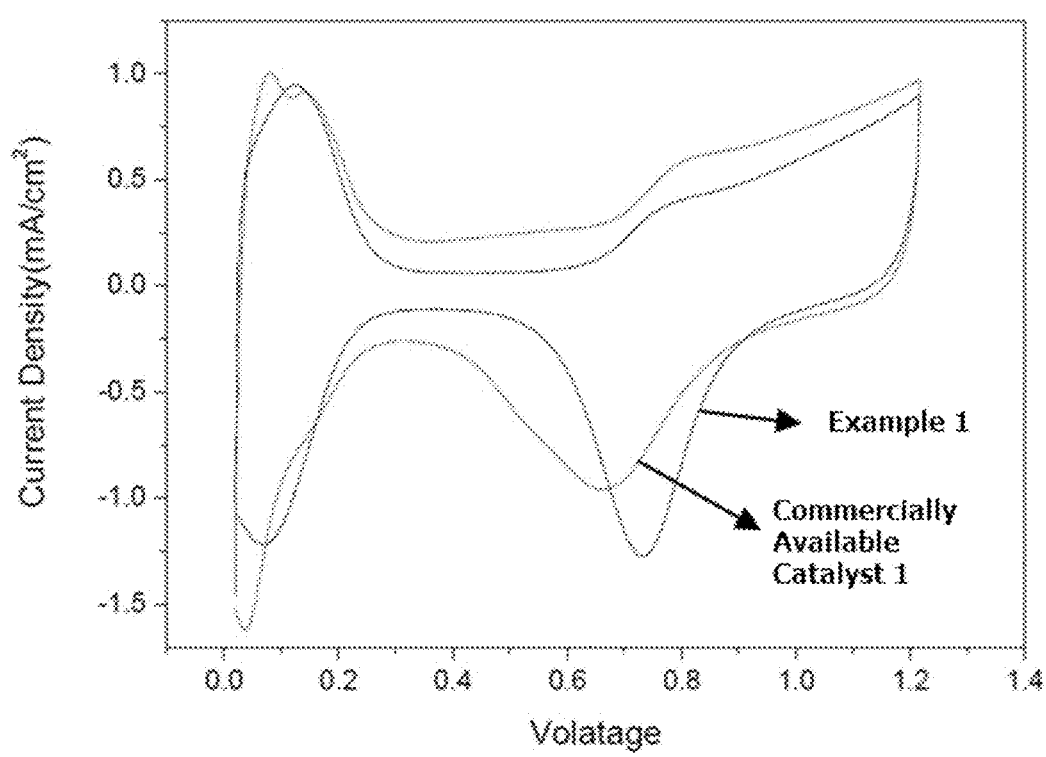

[Figure 8]
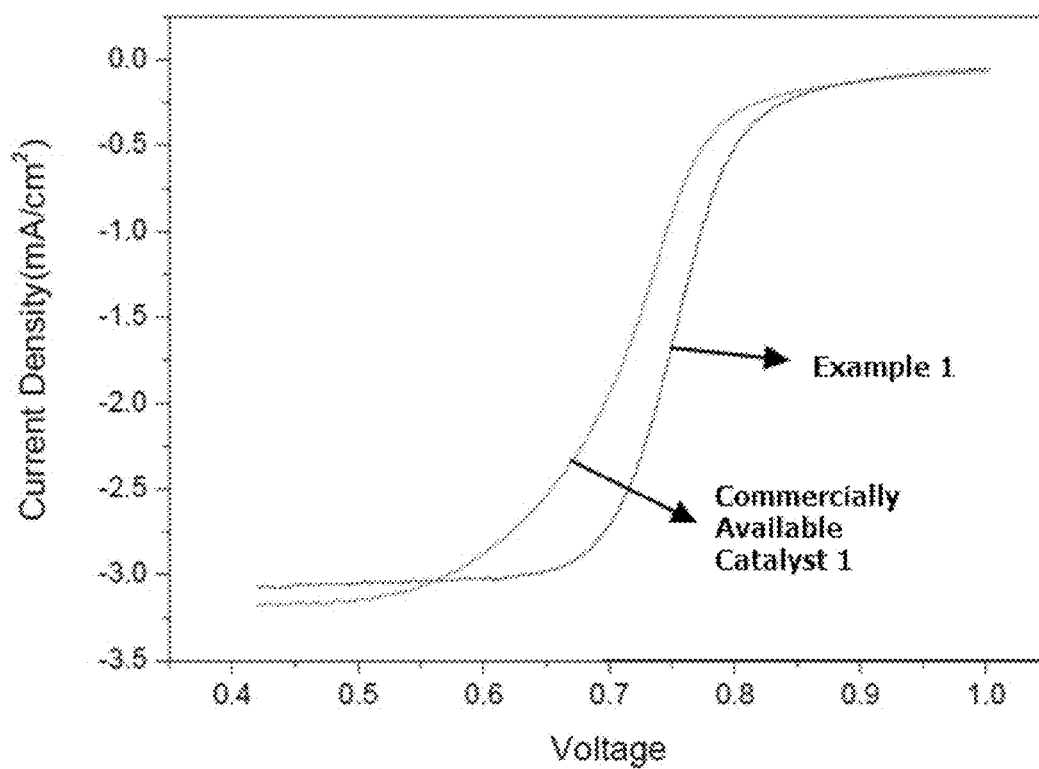

[Figure 9]
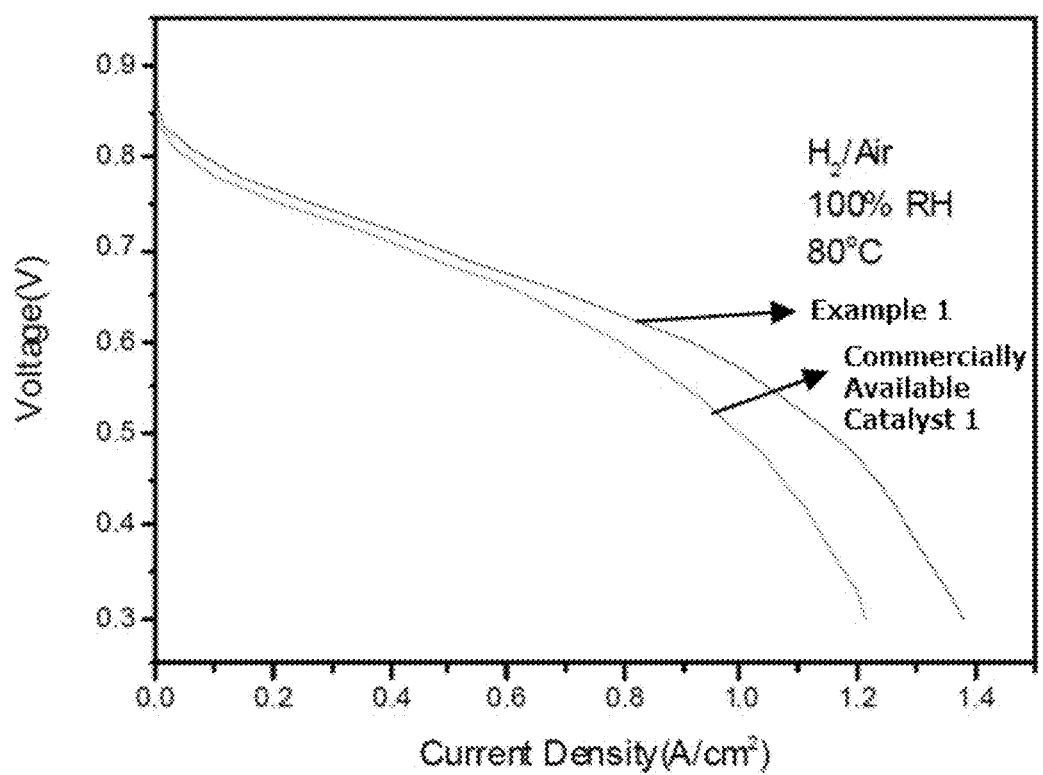

CARRIER-NANOPARTICLE COMPLEX, METHOD FOR PREPARING SAME, AND CATALYST COMPRISING SAME

TECHNICAL FIELD

The present specification claims priority to and the benefit of Korean Patent Application No. 10-2014-0152440 filed in the Korean Intellectual Property Office on Nov. 4, 2014, the entire contents of which are incorporated herein by reference.

The present specification relates to a carrier-nanoparticle complex, a method for preparing the same, and a catalyst comprising the same.

BACKGROUND ART

Nanoparticles are particles having nanoscale particle sizes, and show optical, electrical and magnetic properties completely different from those of bulk materials due to a large specific surface area and the quantum confinement effect, in which energy required for electron transfer changes depending on the size of material. Accordingly, due to such properties, much interest has been concentrated on the applicability of nanoparticles in the catalyst, electromagnetic, optical, medical fields, and the like. Nanoparticles may be considered as intermediates between bulks and molecules, and may be synthesized in terms of two approaches, that is, the "top-down" approach and the "bottom-up" approach.

Examples of a method for synthesizing a metal nanoparticle comprise a method for reducing metal ions in a solution by using a reducing agent, a method for using gamma-rays, an electrochemical method, and the like, but in the existing methods, it is difficult to synthesize nanoparticles having a uniform size and shape, or it is difficult to economically mass-produce high-quality nanoparticles for various reasons such as problems of environmental contamination, high costs, and the like by using organic solvents.

Meanwhile, [Nano Lett., 2011, 11(3), pp 919-926] describes a method for preparing a core-shell particle comprising gold (Au) as a core and platinum (Pt) as a shell, but only discloses a method for preparing a core-shell particle by using platinum (Pt)-acetylacetonate $(Pt-(acac)_2)$, which is an organic metal compound, and an organic solvent, and does not describe a method for preparing a core-shell particle, which may solve environmental pollution and high cost problems.

DETAILED DESCRIPTION OF THE INVENTION

Technical Problem

The present specification has been made in an effort to provide a carrier-nanoparticle complex capable of overcoming the problems, a method for preparing the same, and a catalyst comprising the same.

Technical Solution

An exemplary embodiment of the present specification provides a method for preparing a carrier-nanoparticle complex in which core-shell nanoparticles are supported on a carrier, the method comprising: forming a first solution comprising an aqueous solvent, a precursor of a first metal, a precursor of a second metal, and a carrier; forming a core portion comprising the first metal and the second metal by adding a first reducing agent to the first solution; adjusting a pH of the first solution to 8 or more between the forming of the first solution and the forming of the core portion; forming a second solution by adding a Pt precursor to the first solution after the forming of the core portion; forming a shell portion comprising Pt on at least a portion of a surface of the core portion by adding a second reducing agent to the second solution; and adjusting a pH of the second solution to 8 or more between the forming of the second solution and the forming of the shell portion.

An exemplary embodiment of the present specification provides a carrier-nanoparticle complex prepared by using the preparation method.

An exemplary embodiment of the present specification provides a carrier-nanoparticle complex comprising: core-shell nanoparticles which comprises a core portion comprising two different transition metals and a shell portion comprising Pt formed on at least a portion of a surface of the core portion; and a carrier on which the core-shell nanoparticles are supported, in which at least a portion of a surface of the carrier is coated with a polymer electrolyte which comprises one or more functional groups comprising nitrogen, and the at least one core-shell nanoparticle is bonded to a nitrogen atom of the surface of the carrier.

An exemplary embodiment of the present specification provides a catalyst comprising the carrier-nanoparticle complex.

Advantageous Effects

A method for preparing a carrier-nanoparticle complex according to an exemplary embodiment of the present specification does not use an organic solvent which is highly likely to cause environmental pollutions, but uses an aqueous solvent, and thus has an advantage in that there is little environmental pollution.

The method for preparing a carrier-nanoparticle complex according to an exemplary embodiment of the present specification is carried out under a low temperature atmosphere of 100° C. or less, and thus has an advantage in that the carrier-nanoparticle complex may be prepared in large amounts at a low cost.

The method for preparing a carrier-nanoparticle complex according to an exemplary embodiment of the present specification does not use a surfactant, and thus has an advantage in that hazardous materials are generated in small amounts in the preparation process, and the carrier-nanoparticle complex may be easily formed at a low cost.

A carrier-nanoparticle complex according to an exemplary embodiment of the present specification may implement high catalytic activity because core-shell nanoparticles with a uniform size are uniformly supported on a carrier.

BRIEF DESCRIPTION OF DRAWINGS

The patent or application file contains at least one color drawing. Copies of this patent or patent application publication with color drawing will be provided by the USPTO upon request and payment of the necessary fee.

FIGS. 1 and 2 each illustrate a transmission electron microscope (TEM) image of the carrier-nanoparticle complex prepared according to Example 1.

FIG. 3 illustrates a high-angle annular dark-field (HADDF) image of the carrier-nanoparticle complex according to Example 1.

FIG. 4 illustrates a transmission electron microscope (TEM) image of the carrier-nanoparticle complex prepared according to Reference Example 1.

FIG. 5 illustrates a transmission electron microscope (TEM) image of the carrier-nanoparticle complex prepared according to Reference Example 2.

FIG. 6 illustrates the result of the energy dispersive spectroscopy (EDS) line scanning of the carrier-nanoparticle complex according to Example 1.

FIG. 7 illustrates the cyclic voltammetry (CV) of the carrier-nanoparticle complexes according to Example 1 and Comparative Example 1.

FIG. 8 illustrates the linear sweep voltammetry (LSV) of the carrier-nanoparticle complexes according to Example 1 and Comparative Example 1.

FIG. 9 is a result of measuring the performances of single cells comprising the carrier-nanoparticle complexes according to Example 1 and Comparative Example 1.

BEST MODE

Hereinafter, the present specification will be described in more detail.

When one part "comprises" one constituent element in the present specification, unless otherwise specifically described, this does not mean that another constituent element is excluded, but means that another constituent element may be further comprised.

An exemplary embodiment of the present specification provides a method for preparing a carrier-nanoparticle complex in which core-shell nanoparticles are supported on a carrier, the method comprising: forming a first solution comprising an aqueous solvent, a precursor of a first metal, a precursor of a second metal, and a carrier; forming a core portion comprising the first metal and the second metal by adding a first reducing agent to the first solution; adjusting a pH of the first solution to 8 or more between the forming of the first solution and the forming of the core portion; forming a second solution by adding a Pt precursor to the first solution after the forming of the core portion; forming a shell portion comprising Pt on at least a portion of a surface of the core portion by adding a second reducing agent to the second solution; and adjusting a pH of the second solution to 8 or more between the forming of the second solution and the forming of the shell portion.

According to an exemplary embodiment of the present specification, the core-shell nanoparticle may comprise a shell portion comprising Pt on at least a portion of a surface of a core portion comprising two metals. Specifically, according to an exemplary embodiment of the present specification, the core-shell nanoparticle may comprise a shell portion comprising Pt on the entire surface of a core portion comprising two metals.

A precursor in the present specification means a salt comprising metal ion. The precursor may be dissociated in a solvent to provide metal ions, and the metal ion is reduced by a reducing agent, and thus may become a metal constituting the core-shell nanoparticle.

An exemplary embodiment of the present specification may further comprise adjusting a pH of the first solution to 8 or more between the forming of the first solution and the forming of the core portion. Specifically, the adjusting of the pH of the first solution to 8 or more may be adjusting the pH to 8 or more and 13 or less. More specifically, the adjusting of the pH of the first solution to 8 or more may be adjusting the pH to 10.

When the pH of the first solution is adjusted to the aforementioned range, there is an advantage in that the dispersibility of the core portion to be synthesized is excellent.

An exemplary embodiment of the present specification may further comprise adjusting a pH of the second solution to 8 or more between the forming of the second solution and the forming of the shell portion. Specifically, the adjusting of the pH of the second solution to 8 or more may be adjusting the pH to 8 or more and 13 or less. More specifically, the adjusting of the pH of the second solution to 8 or more may be adjusting the pH to 10.

When the pH of the second solution is adjusted to the aforementioned range, the surface of the core portion is negatively charged, and as a result, the shell portion is easily formed because the Pt precursor is easily positioned on the surface of the core portion.

According to an exemplary embodiment of the present specification, in the process of adjusting the pH, the pH may be adjusted by adding a base solution. Specifically, the pH may be adjusted by adding a base solution selected from the group consisting of sodium hydroxide (NaOH), barium hydroxide ($Ba(OH)_2$), potassium hydroxide (KOH), calcium hydroxide ($Ca(OH)_2$), and lithium hydroxide (LiOH).

According to an exemplary embodiment of the present specification, the precursor of the first metal and the precursor of the second metal may be different transition metal precursors, and at least one thereof may be a Pd precursor.

According to an exemplary embodiment of the present specification, the precursor of the first metal may be a Pd precursor, and the precursor of the second metal may be a precursor of Co, Ni, Fe, or Cu.

According to an exemplary embodiment of the present specification, the precursor of the first metal, the precursor of the second metal, and the Pt precursor may be an aqueous metal salt.

Specifically, according to an exemplary embodiment of the present specification, the precursor of the first metal, the precursor of the second metal, and the Pt precursor may be ionized in an aqueous solvent.

The preparation method according to an exemplary embodiment of the present specification prepares the carrier-nanoparticle complex by using an aqueous solvent and an aqueous metal salt, and thus has an advantage in that a reducing or thermally decomposing process at high temperature is not needed. Specifically, when nanoparticles are prepared by using a carbonyl-based metal precursor or an acetylacetonate-based metal precursor in an organic solvent, there is a problem in that a reducing process or a thermally decomposing process under a high temperature atmosphere exceeding 100° C. is needed.

Further, the preparation method according to an exemplary embodiment of the present specification uses an aqueous metal salt which is relatively inexpensive and less hazardous, and thus may reduce management costs generated in the preparing process.

According to an exemplary embodiment of the present specification, the first metal may be Pd, and the second metal may be ruthenium (Ru), molybdenum (Mo), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag) or copper (Cu).

According to an exemplary embodiment of the present specification, the precursor of the first metal may be a nitrate ($NO_3^-$), a halide, a hydroxide ($OH^-$) or a sulfate ($SO_4^-$) of the first metal, and the precursor of the second metal may be a nitrate ($NO_3^-$), a halide, a hydroxide ($OH^-$) or a sulfate ($SO_4^-$) of the second metal.

According to an exemplary embodiment of the present specification, the halide may be chloride ($Cl^-$), bromide ($Br^-$), or iodide ($I^-$).

According to an exemplary embodiment of the present specification, the Pt precursor may be represented by the following Chemical Formula 1.

$$PtA_mB_n \quad \text{[Chemical Formula 1]}$$

In Chemical Formula 1,

A is ($NH_3$), ($CH_3NH_2$), or ($H_2O$),

B is a monovalent anion, m is 2, 4, or 6, and n is an integer of any one of 1 to 7.

According to an exemplary embodiment of the present specification, B may be $NO_3^-$, $NO_2^-$, $OH^-$, $F^-$, $Cl^-$, $Br^-$, or $I^-$.

According to an exemplary embodiment of the present specification, the Pt precursor may be $Pt(NH_3)_4(NO_3)_2$, $Pt(NH_3)_4Cl_2$, $Pt(CH_3NH_2)_4(NO_3)_2$, $Pt(CH_3NH_2)_4Cl_2$, $Pt(H_2O)_4(NO_3)_2$, or $Pt(H_2O)_4Cl_2$.

The preparation method according to an exemplary embodiment of the present specification has an advantage in that a process of supporting nanoparticles on a carrier is not separately needed. Specifically, a separate supporting process is not needed because the first solution comprises the precursor of the first metal, the precursor of the second metal, and the carrier, and thus a carrier-nanoparticle complex is prepared by a one-pot process. When a carrier-nanoparticle complex is prepared while together comprising a carrier during the process of forming nanoparticles as described above, there is an advantage in that the adhesion between the carrier and the nanoparticles and the dispersibility are excellent.

When the adhesion between the carrier and the nanoparticles is excellent, there is an advantage in that the durability may be improved because the interaction between the nanoparticles and the carrier is improved. Furthermore, when the dispersibility of nanoparticles is excellent on the carrier, there is an effect in that the reactivity is improved because the number of active points which may participate in reactions is increased.

According to an exemplary embodiment of the present specification, the carrier may be a carbon-based carrier.

Specifically, according to an exemplary embodiment of the present specification, the carbon-based carrier may comprise one or more selected from the group consisting of carbon black, carbon nanotube (CNT), graphite, graphene, activated carbon, mesoporous carbon, carbon fiber, and carbon nano wire.

According to an exemplary embodiment of the present specification, at least a portion of a surface of the carrier may be coated with a polymer electrolyte comprising one or more functional groups which comprise nitrogen.

According to an exemplary embodiment of the present specification, the functional group comprising nitrogen may be an amine group or an imine group.

According to an exemplary embodiment of the present specification, the polymer electrolyte may be a polymer electrolyte in which at least one amine group or imine group is substituted at a straight-chained or branch-chained hydrocarbon chain.

According to an exemplary embodiment of the present specification, at least one core-shell nanoparticle may be bonded to the amine group of the polymer electrolyte to be supported onto the carbon-based carrier.

The polymer electrolyte of the present specification may mean a polymer having electric charges. Specifically, the polymer electrolyte may be a synthetic polymer or ion exchange resin having electric charges, and the like.

According to the carrier-nanoparticle complex according to an exemplary embodiment of the present specification, it is possible to induce bonding of an amine group to the core-shell nanoparticle by coating a region of the surface of the carrier with a polymer electrolyte comprising the amine group. Accordingly, the aggregation phenomenon of the core-shell nanoparticles may be alleviated to enhance the dispersibility of the core-shell nanoparticles.

According to an exemplary embodiment of the present specification, the polymer electrolyte may comprise a polyallylamine hydrochloride (PAH)-based material or a polyethylene imine (PEI)-based material.

According to an exemplary embodiment of the present specification, the forming of the core portion may be carried out at a temperature of 0° C. or more and 100° C. or less. Specifically, the forming of the core portion may be carried out at a temperature of 50° C. or more and 75° C. or less.

According to an exemplary embodiment of the present specification, the forming of the shell portion may be carried out at room temperature.

The room temperature means a temperature in a range of 4° C. to 35° C., more specifically 15° C. to 28° C.

The preparation method according to an exemplary embodiment of the present specification is carried out under a low temperature condition of 100° C. or less, and thus has an advantage in that high costs are not needed in order to meet the process conditions.

According to an exemplary embodiment of the present specification, the aqueous solvent may comprise water. Specifically, according to an exemplary embodiment of the present specification, the aqueous solvent may be water or a mixture of water and a $C_1$ to $C_6$ alcohol, and may be more specifically water.

According to an exemplary embodiment of the present specification, the preparation method may not use a surfactant.

The preparation method uses water and does not use a surfactant, and thus has an effect of reducing costs, and accordingly, the preparation method is also advantageous in being favorable for mass production, and is advantageous in terms of an eco-friendly process. When a surfactant is used, the surfactant surrounds the surface of the particle, so that a post-process of removing the surfactant is needed because there is a problem in that the reactants are not easily accessed when the surfactant is used in a catalyst reaction. Accordingly, when the surfactant is not used, the preparation method has an effect of reducing costs, and is also favorable for mass production because the process is simplified.

According to an exemplary embodiment of the present specification, the first solution may further comprise a stabilizer.

According to an exemplary embodiment of the present specification, the stabilizer may comprise one or two or more selected from the group consisting of disodium phosphate, dipotassium phosphate, disodium citrate, and trisodium citrate.

According to an exemplary embodiment of the present specification, the first reducing agent and the second reducing agent are not particularly limited as long as the first reducing agent and the second reducing agent each have a reducing force capable of precipitating metal particles by reducing dissolved metal ions while being a strong reducing agent having a standard reduction potential of −0.23 V or less.

According to an exemplary embodiment of the present specification, the first reducing agent and the second reducing agent may be at least one selected from the group consisting of $NaBH_4$, $NH_2NH_2$, $LiAlH_4$, and LiBEt3H.

When a weak reducing agent is used, it is difficult to achieve a continuous process in that the reaction rate is slow, and a subsequent heating of a solution is required, and the like, so that there may be a problem with mass production. In particular, when ethylene glycol, which is a kind of weak reducing agent, is used, there is a problem in that the productivity in the continuous process is low due to a reduction in flow rate caused by high viscosity.

According to an exemplary embodiment of the present specification, a molar ratio of the precursor of the first metal to the precursor of the second metal may be 1:1 to 1:3.

According to an exemplary embodiment of the present specification, a mole number of the Pt precursor may be 0.5 times to 2 times a mole number of the precursor of the first metal.

An exemplary embodiment of the present specification provides a carrier-nanoparticle complex prepared by the preparation method. Specifically, an exemplary embodiment of the present specification provides a carrier-nanoparticle complex prepared by the preparation method, the carrier-nanoparticle complex comprising: core-shell nanoparticles which comprises a core portion comprising two different transition metals and a shell portion comprising Pt formed on at least a portion of a surface of the core portion; and a carrier on which the core-shell nanoparticles are supported.

In addition, an exemplary embodiment of the present specification provides a carrier-nanoparticle complex comprising: core-shell nanoparticles which comprises a core portion comprising two different transition metals and a shell portion comprising Pt formed on at least a portion of a surface of the core portion; and a carrier on which the core-shell nanoparticles are supported, in which at least a portion of a surface of the carrier is coated with a polymer electrolyte which comprises one or more functional groups comprising nitrogen, and at least one core-shell nanoparticle is bonded to a nitrogen atom of the surface of the carrier.

According to an exemplary embodiment of the present specification, the polymer electrolyte may be a polymer electrolyte in which at least one amine group or imine group is substituted at a straight-chained or branch-chained hydrocarbon chain.

According to an exemplary embodiment of the present specification, the polymer electrolyte may comprise a polyallylamine hydrochloride (PAH)-based material or a polyethylene imine (PEI)-based material.

According to an exemplary embodiment of the present specification, the at least one core-shell nanoparticle may be bonded to a nitrogen atom of the polymer electrolyte to be bonded to the carrier.

According to an exemplary embodiment of the present specification, as a result of an energy dispersive spectroscopy (EDS) line scanning of the carrier-nanoparticle complex, a position of Pt of the core-shell nanoparticle may be overlapped with a position of N of the polymer electrolyte. FIG. 6 illustrates the result of the energy dispersive spectroscopy (EDS) line scanning according to Example 1 of the present specification, and illustrates that the positions of Pt of the core-shell nanoparticle and N of the polymer electrolyte are overlapped with each other. Specifically, each N comprised in the polymer electrolyte may be bonded to each core-shell nanoparticle to uniformly disperse core-shell nanoparticles on the carrier.

According to the carrier-nanoparticle complex according to an exemplary embodiment of the present specification, N of the polymer electrolyte coated onto the carrier is bonded to the core-shell nanoparticle, and as a result, the core-shell nanoparticles may be supported onto the carrier with high dispersity, and a high bonding force between the core-shell nanoparticles and the carrier may be exhibited.

According to an exemplary embodiment of the present specification, the core-shell nanoparticles may have a particle diameter of 1 nm or more and 10 nm or less. Specifically, according to an exemplary embodiment of the present specification, the core-shell nanoparticles may have a particle diameter of 3 nm or more and 6 nm or less.

According to an exemplary embodiment of the present specification, the content of the core-shell nanoparticles may be 20 wt % or more and 50 wt % or less based on the carrier-nanoparticle complex.

In the carrier-nanoparticle complex according to an exemplary embodiment of the present specification, the carrier and the nanoparticles are the same as those described above.

An exemplary embodiment of the present specification provides a catalyst comprising the carrier-nanoparticle complex.

The carrier-nanoparticle complex according to an exemplary embodiment of the present specification may be used while replacing existing nanoparticles in the field in which nanoparticles may be generally used.

The carrier-nanoparticle complex according to an exemplary embodiment of the present specification has a much smaller size and a wider specific surface area than the nanoparticles in the related art, and thus may exhibit better activity than the nanoparticles in the related art. Specifically, the carrier-nanoparticle complex according to an exemplary embodiment of the present specification may be used in the catalyst field.

MODE FOR INVENTION

Hereinafter, the present specification will be described in detail with reference to Examples for specifically describing the present specification. However, the Examples according to the present specification may be modified in various forms, and it is not interpreted that the scope of the present specification is limited to the Examples described below in detail. The Examples of the present specification are provided for more completely explaining the present specification to the person with ordinary skill in the art.

Example 1

A first solution was prepared by adding 0.03 mmol of $K_2PdCl_4$ as a precursor of a first metal, 0.09 mmol of $CoCl_2$ as a precursor of a second metal, 0.45 mmol of trisodium citrate, and 10 mg of carbon treated with polyallylamine hydrochloride (PAH) to 20 ml of distilled water. The pH of the first solution was adjusted to 10, and the first solution was stirred for a predetermined time. And then, the first solution was warmed up to 70° C., and then $NaBH_4$ being a reducing agent was added to the solution to form a core portion comprising Pd and Co. After being stirred for 2 hours, the solution was cooled to room temperature, and 0.03 mmol of $Pt(NH_3)_4(NO_3)_2$ as a Pt precursor was added to the first solution to prepare a second solution, the pH of the second solution was adjusted to 10, and then the second solution was stirred for a predetermined time. Thereafter, NaBH$_4$ being a reducing agent was added to the second solution in a room temperature state to form a shell portion comprising Pt, and then the shell portion was washed with distilled water and dried to prepare a carrier-nanoparticle complex.

A TEM image of the carrier-nanoparticle complex prepared according to Example 1 is illustrated in FIGS. 1 and 2.

According to FIGS. 1 and 2, it can be confirmed that in the carrier-nanoparticle complex prepared according to Example 1, core-shell nanoparticles having a particle diameter of 3 nm to 6 nm are uniformly distributed on a carrier.

Further, FIG. 3 illustrates a high-angle annular dark-field (HADDF) image of the carrier-nanoparticle complex according to Example 1.

According to FIG. 3, it can be confirmed that nanoparticles of the carrier-nanoparticle complex according to Example 1 are core-shell nanoparticles which comprises a shell portion comprising Pt because Pt having a high atomic number in the HADDF is brightly exhibited as compared to Pd.

Further, as the component ratio of core-shell nanoparticles of the carrier-nanoparticle complex according to Example 1, Pt was 25.1 wt %, Pd was 14.43 wt %, and Co was 2.45 wt %. For the analysis of the component ratio, an ICP apparatus was used.

FIG. 6 illustrates the result of the energy dispersive spectroscopy (EDS) line scanning of the carrier-nanoparticle complex according to Example 1. In FIG. 6, it can be seen that when the distribution of elements in a region of nanoparticles supported onto a carrier is reviewed, N is together provided. From the result, it is analyzed that N of PAH coated onto the carrier is bonded to each of the nanoparticle, and as a result, nanoparticles are uniformly dispersed on the carrier. Furthermore, there may also occur an effect in that the bonding force between the nanoparticles and the carrier becomes stronger due to the bonding of N to the nanoparticles.

Comparative Example 1

A carrier-nanoparticle complex was prepared in the same manner as in Example 1, except that the pH of the first solution was adjusted to 2.7.

A TEM image of the carrier-nanoparticle complex prepared according to Reference Example 1 is illustrated in FIG. 4.

According to FIG. 4, it can be confirmed that when the pH is adjusted to acidic at the time of forming a core portion, core portions positioned at the carrier are aggregated and formed.

Comparative Example 2

A carrier-nanoparticle complex was prepared in the same manner as in Example 1, except that the pH of the first solution was adjusted to 7.

A TEM image of the carrier-nanoparticle complex prepared according to Reference Example 2 is illustrated in FIG. 5.

According to FIG. 5, it can be observed that a better dispersibility is exhibited than in Reference Example 1, but the nanoparticles are partially aggregated.

Therefore, it can be seen that a higher dispersibility is exhibited when performing a treatment under a base condition, instead of an acid or neutral condition, at the time of forming a core portion.

Application Example

The carrier-nanoparticle complex prepared according to Example 1 was applied to an electrode catalyst for a fuel cell air electrode. The evaluation of the fuel cell catalyst was carried out in a half cell system. As an electrode, a 3-electrode system, that is, a reference electrode, a counter electrode, and a working electrode were used, the reference electrode was Ag/AgCl, and as an electrolyte, a 0.5 M sulfuric acid solution or a 0.1 M perchloric acid solution was used.

In order to clean a surface of the catalyst, scanning was performed 15 times to 20 times from −0.2 V to 1.0 V by using cyclic voltammetry, and the scan rate was 20 mV/s.

2 mg of a catalyst, 8 µl of 5% Nafion, 1.6 ml of EtOH, and 0.4 ml of H$_2$O were mixed, and the resulting mixture was dispersed for 1 hour by using an ultrasonic cleaner to prepare a catalyst ink, and then 20 µl of the catalyst ink was coated onto a RDE electrode and dried. The amount of catalyst coated onto the electrode was about 20 µg. The area of the electrode was 0.196 cm$^2$.

A 0.1 M perchloric acid solution was bubbled with pure oxygen for 30 minutes, and then circulated from the negative direction to the positive direction from 0.9 V to 0.4 V based on a normal hydrogen electrode (NHE), the scan rate was 20 mV/s, and the electrode was rotated at a rotation speed of 1,600 to 2,500 RPM.

FIG. 7 illustrates the cyclic voltammetry (CV) of the carrier-nanoparticle complexes according to Example 1 and Comparative Example 1. Specifically, in FIG. 7, the hydrogen adsorption and desorption (0 V to 0.4 V) and the oxidation and reduction peaks (0.6 V to 1.0 V) of Pt may be observed at the electrodes in a half cell, and the ECSA may be calculated by using the area of the hydrogen adsorption and desorption peak.

FIG. 8 illustrates the linear sweep voltammetry (LSV) of the carrier-nanoparticle complexes according to Example 1 and Comparative Example 1. Specifically, FIG. 8 is for observing only the oxidation reduction reaction of the half cell, a shift to a high potential in the graph means that the reduction reaction occurs more easily, and it can be seen that the carrier-nanoparticle complex according to Example 1 exhibits a higher potential at the same current density than Commercially Available Catalyst 1, and thus exhibits excellent catalytic activity.

The oxygen reduction reaction (ORR) activity was measured by using 20 wt % and 46 wt % of Pt/C (carbon-supported Pt) commercially available catalysts as the catalyst and the carrier-nanoparticle complex prepared according to Example 1. The ORR activity results are as in the following Table 1.

TABLE 1

| @0.8 V | Example 1 (25% Pt) | Commercially Available Catalyst 1 (20% Pt) | Commercially Available Catalyst 2 (46% Pt) |
|---|---|---|---|
| ECSA (m$^2$/g Pt) | 107.0 | 78.4 | 71.9 |
| Mass Activity (A/g Pt) | 40.8 | 21.7 | 16.25 |

TABLE 1-continued

| @0.8 V | Example 1 (25% Pt) | Commercially Available Catalyst 1 (20% Pt) | Commercially Available Catalyst 2 (46% Pt) |
|---|---|---|---|
| Mass Activity (A/g metal) | 24.6 | 21.7 | 16.25 |

According to Table 1, based on the content of Pt, the activity per mass at 0.8 V of the carrier-nanoparticle complex according to Example 1 was nearly 2 times higher than those of the commercially available catalysts. In addition, based on the content of all the metals, the carrier-nanoparticle complex according to Example 1 produced a higher result than those of the commercially available catalysts.

Furthermore, it can be confirmed that based on the content of Pt, the electrochemically active surface area (ECSA) of the carrier-nanoparticle complex according to Example 1 is better by approximately 35% than those of the commercially available catalysts. The aforementioned results mean that a wider surface area per mass of Pt was formed than Pt particles, and thus the activity per mass of Pt was excellent because Pt formed a shell portion to have a thin thickness on the surface of the core portion.

FIG. 9 is a result of measuring the performances of single cells comprising the carrier-nanoparticle complexes according to Example 1 and Comparative Example 1 as an electrode catalyst. In this case, the size of the membrane electrode assembly was 2.5 cm×2.5 cm, $H_2$/Air was supplied under a 100% humidity condition, the performance of the single cell was measured under an atmosphere of 80° C., and the sum of the masses of Pt and Pd per unit area of the carrier-nanoparticle complex according to Example 1 was 0.2 mg/cm$^2$.

As can be seen from the result of FIG. 9, it can be confirmed that the single cell comprising the carrier-nanoparticle complex according to Example 1 as an electrode catalyst exhibits a better performance than the single cell comprising the carrier-nanoparticle complex according to Comparative Example 1 as an electrode catalyst.

The invention claimed is:

1. A method for preparing a carrier-nanoparticle complex in which core-shell nanoparticles are supported on a carrier, the method comprising:
    forming a first solution comprising an aqueous solvent, a precursor of a first metal, a precursor of a second metal, and the carrier;
    forming a core portion comprising the first metal and the second metal by adding a first reducing agent to the first solution;
    adjusting a pH of the first solution to 8 or more between the forming of the first solution and the forming of the core portion;
    forming a second solution by adding a Pt precursor to the first solution after the forming of the core portion;
    forming a shell portion comprising Pt on at least a portion of a surface of the core portion by adding a second reducing agent to the second solution; and
    adjusting a pH of the second solution to 8 or more between the forming of the second solution and the forming of the shell portion,
    wherein the first metal is Pd, and the second metal is cobalt (Co), iron (Fe), or copper (Cu),
    wherein the core-shell nanoparticles have a particle diameter of 1 nm or more and 10 nm or less,
    wherein at least a portion of a surface of the carrier is coated with a polymer electrolyte which comprises one or more functional groups comprising nitrogen;
    wherein the forming of the shell portion is carried out at a temperature of 4° C. to 35° C.;
    wherein the forming of the core portion is carried out at a temperature of 50° C. or more and 75° C. or less, and
    wherein the first reducing agent and the second reducing agent each are at least one selected from the group consisting of $NaBH_4$, $NH_2NH_2$, $LiAlH_4$, and $LiBEt_3H$.

2. The method of claim 1, wherein the precursor of the first metal is a nitrate ($NO_3^-$), a halide, a hydroxide ($OH^-$) or a sulfate ($SO_4^-$) of the first metal, and
the precursor of the second metal is a nitrate ($NO_3^-$), a halide, a hydroxide ($OH^-$) or a sulfate ($SO_4^-$) of the second metal.

3. The method of claim 1, wherein the Pt precursor is represented by the following Chemical Formula 1:

$$PtA_mB_n \qquad \text{[Chemical Formula 1]}$$

in Chemical Formula 1,
A is ($NH_3$), ($CH_3NH_2$), or ($H_2O$),
B is $NO_3^-$, $NO_2^-$, $OH^-$, $F^-$, $Cl^-$, $Br^-$, or $I^-$,
m is 2, 4, or 6, and
n is an integer of any one of 1 to 7.

4. The method of claim 1, wherein the polymer electrolyte comprises a polyallylamine hydrochloride (PAH)-based material or a polyethylene imine (PEI)-based material.

5. The method of claim 1, wherein the aqueous solvent is water.

6. The method of claim 1, wherein the first solution further comprises a stabilizer.

7. The method of claim 1, wherein a molar ratio of the precursor of the first metal to the precursor of the second metal is 1:1 to 1:3.

8. The method of claim 1, wherein a mole number of the Pt precursor is 0.5 times to 2 times a mole number of the precursor of the first metal.

* * * * *